United States Patent
Abe et al.

(10) Patent No.: US 9,415,892 B2
(45) Date of Patent: Aug. 16, 2016

(54) CONTAINER FOR NONAQUEOUS ELECTROLYTE SOLUTION, NONAQUEOUS ELECTROLYTE SOLUTION TO PUT IN CONTAINER, AND METHOD FOR STORING NONAQUEOUS ELECTROLYTE SOLUTION

(75) Inventors: Koji Abe, Yamaguchi (JP); Akikazu Ito, Yamaguchi (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 326 days.

(21) Appl. No.: 13/884,448

(22) PCT Filed: Nov. 8, 2011

(86) PCT No.: PCT/JP2011/075750
§ 371 (c)(1),
(2), (4) Date: Jul. 24, 2013

(87) PCT Pub. No.: WO2012/063832
PCT Pub. Date: May 18, 2012

(65) Prior Publication Data
US 2013/0295467 A1    Nov. 7, 2013

(30) Foreign Application Priority Data

Nov. 11, 2010 (JP) .................................. 2010-252726

(51) Int. Cl.
| | | |
|---|---|---|
| H01M 10/06 | (2006.01) | |
| B65D 1/12 | (2006.01) | |
| H01G 11/58 | (2013.01) | |
| H01G 11/78 | (2013.01) | |
| H01M 10/0566 | (2010.01) | |
| H01M 10/056 | (2010.01) | |
| B65D 1/02 | (2006.01) | |
| B65D 41/28 | (2006.01) | |
| B65D 51/18 | (2006.01) | |
| H01M 10/052 | (2010.01) | |

(52) U.S. Cl.
CPC ................ *B65D 1/12* (2013.01); *B65D 1/0207* (2013.01); *B65D 41/28* (2013.01); *B65D 51/18* (2013.01); *H01G 11/58* (2013.01); *H01G 11/78* (2013.01); *H01M 10/056* (2013.01); *H01M 10/0566* (2013.01); *B65D 2251/0015* (2013.01); *B65D 2251/0075* (2013.01); *B65D 2251/0078* (2013.01); *H01M 10/052* (2013.01); *H01M 2300/0025* (2013.01); *Y02E 60/13* (2013.01); *Y02T 10/7011* (2013.01); *Y02T 10/7022* (2013.01)

(58) Field of Classification Search
CPC ... H01G 11/58; H01G 11/78; H01M 10/0566; H01M 10/056; H01M 10/0567; H01M 10/0568; H01M 10/0569; B65D 1/12; B65D 1/0207; B65D 41/28; B65D 51/18; B65D 2251/0078; B65D 2251/0015; B65D 2251/0075

See application file for complete search history.

(56) References Cited

U.S. PATENT DOCUMENTS

| | | | | |
|---|---|---|---|---|
| 6,467,641 | B1 * | 10/2002 | Minogue ....................... | 220/559 |
| 2003/0102278 | A1 * | 6/2003 | Chupak ......................... | 215/40 |
| 2003/0129487 | A1 * | 7/2003 | Inoue .................. | H01M 2/0262 |
| | | | | 429/176 |
| 2010/0065528 | A1 * | 3/2010 | Hanafusa et al. ............ | 215/347 |

FOREIGN PATENT DOCUMENTS

| | | |
|---|---|---|
| FR | 2 625 479 A1 | 7/1989 |
| JP | 56 51260 | 5/1981 |
| JP | 5 31814 | 4/1993 |
| JP | 7 192761 | 7/1995 |
| JP | 3023499 | 4/1996 |
| JP | 2002 334696 | 11/2002 |
| JP | 2009 12848 | 1/2009 |
| JP | 2010 92748 | 4/2010 |
| WO | WO 03/047991 A1 | 6/2003 |

OTHER PUBLICATIONS

Extended European Search Report issued Jan. 19, 2015 in Patent Application No. 11839192.9.
International Search Report Issued Jan. 24, 2012 in PCT/JP11/75750 Filed Nov. 8, 2011.

* cited by examiner

*Primary Examiner* — Muhammad Siddiquee
(74) *Attorney, Agent, or Firm* — Oblon, McClelland, Maier & Neustadt, L.L.P.

(57) ABSTRACT

(1) A container for a nonaqueous electrolytic solution, containing a material containing an aluminum or aluminum alloy layer, and storing a nonaqueous electrolytic solution containing a nonaqueous solvent having dissolved therein an electrolyte salt, the container having a cap and a plug each formed of a resin, and maintaining the nonaqueous electrolytic solution to have a water content of 50 ppm or less after storing in the container for 30 days, (2) a nonaqueous electrolytic solution placed in the container, and (3) a method for storing a nonaqueous electrolytic solution. The container for a nonaqueous electrolytic solution is a light weight container that prevents the nonaqueous electrolytic solution from being decomposed on storing to maintain the high quality, and facilitates and ensures the handling of the nonaqueous electrolytic solution.

19 Claims, 2 Drawing Sheets

CONTAINER FOR NONAQUEOUS ELECTROLYTE SOLUTION, NONAQUEOUS ELECTROLYTE SOLUTION TO PUT IN CONTAINER, AND METHOD FOR STORING NONAQUEOUS ELECTROLYTE SOLUTION

This application is a 371 of PCT/JP2011/075750 filed Nov. 8, 2011. Priority to Japanese patent application 2010-252726, filed Nov. 11, 2010, is claimed.

TECHNICAL FIELD

The present invention relates to a container for a nonaqueous electrolytic solution, a nonaqueous electrolytic solution placed in a container, and a method for storing a nonaqueous electrolytic solution.

BACKGROUND ART

In recent years, an electrochemical element, particularly a lithium secondary battery, is being widely used for an electric power source of an electronic device, such as a mobile phone and a notebook personal computer, an electric power source of an electric vehicle, and an electric power storage.

A lithium secondary battery is constituted mainly from a positive electrode containing a material capable of absorbing and releasing lithium, a negative electrode and a nonaqueous electrolytic solution containing a lithium salt and a nonaqueous solvent, and as the nonaqueous solvent, organic solvents, such as a cyclic carbonate, a linear carbonate, a linear carboxylate ester, a lactone and an ether, have been used.

The nonaqueous electrolytic solution has been used by storing in a stainless steel container for preventing the container from being corroded on storing. However, a stainless steel container has problems that the container is inferior in handleability due to the large weight thereof, that the container is difficult to be reduced in weight and size due to the poor processability thereof, and the like. Furthermore, an ordinary stainless steel container has a cap, which is also formed of stainless steel, and thus there is also another problem that when dripping occurs on using, solid matters are deposited on the screw part at the neck portion of the container to increase the force required for opening and closing the cap, and simultaneously deterioration of the nonaqueous electrolytic solution is accelerated. Accordingly, there has been a demand of a container for an electrolytic solution that has corrosion resistance, a light weight and excellent handleability, and a storing method therefor.

As a container for storing a nonaqueous electrolytic solution, for example, Patent Document 1 discloses a polyethylene resin container having a body that is sealed with a thin film part formed at the end of a cylindrical container for enhancing the corrosion resistance and durability and for enhancing the sealing function, the container being used after opening the body by breaking the thin film part. However, the container may not ensure the sealing property of the container after opening once.

Patent Document 2 discloses an electrolytic solution container having a rubber cap for sealing a liquid charging port, but the sealing property of the liquid charging port may be insufficient.

Patent Document 3 discloses in the examples a nonaqueous electrolytic solution for a secondary battery that contains a nonaqueous electrolytic solution containing a nonaqueous solvent containing a cyclic carbonate and a linear carbonate, having $LiPF_6$ dissolved therein, and contains a particular disiloxane, and the nonaqueous electrolytic solution is sealed and stored in a stainless steel container for 30 days. However, there is a problem that a stainless steel container is inferior in handleability due to the large weight thereof since the electrolytic solution is generally handled in a narrow space, such as a globe box.

As a canister container for a beverage, an edible oil and the like as a content, a so-called resealable canister has been known that has a neck portion capable of being engaged with a sealing cap and is capable of being resealed with a cap detachable to the neck portion. The resealable canister is formed of a metal thin plate, such as an aluminum alloy plate and a stainless steel plate, but the sealing function of the neck portion of the container is generally insufficient when chemicals are contained as a content liquid.

RELATED ART DOCUMENTS

Patent Documents

Patent Document 1: JP-U-B-5-31814
Patent Document 2: JP-U-A-56-51260
Patent Document 3: JP-A-2010-92748

SUMMARY OF THE INVENTION

Problems to be Solved by the Invention

In view of the strength of a stainless steel plate and the corrosion resistance of aluminum, it has been ordinarily considered that there is no attempt of changing the material of a container for a nonaqueous electrolytic solution from a stainless steel plate to aluminum.

An object of the present invention is to provide a container for a nonaqueous electrolytic solution that prevents the nonaqueous electrolytic solution from being decomposed on storing to maintain the high quality, and facilitates and ensures the handling of the nonaqueous electrolytic solution, a nonaqueous electrolytic solution placed in a container, and a method for storing a nonaqueous electrolytic solution.

Means for Solving the Problems

The known containers, for example, the containers made of stainless steel, which have a large weight, require power for handling in a narrow space, such as a globe box, and thus there is a problem of decreasing the working efficiency. Furthermore, on repeating open and close of the cap, deposits of the electrolytic solution are accumulated between the cap and the body of the container, which requires a force on opening and closing the cap, and thus there is a problem of decreasing the handleability.

As a result of detailed investigations by the present inventors on the known containers for the storing capabilities of a nonaqueous electrolytic solution, it has been found that the known containers fail to ensure sufficient corrosion resistance after opening once, and thus may not be used as a container for storing a nonaqueous electrolytic solution that is necessarily opened and closed repeatedly.

As a result of investigations made by the present inventors for solving the problems, it has been found that a container for a nonaqueous electrolytic solution constituted by aluminum or an aluminum alloy, which is capable of maintaining the water content of the nonaqueous electrolytic solution to 50 ppm or less on storing, has a light weight and excellent handleability, and also maintains the quality of the nonaqueous electrolytic solution, and thus the present invention has been completed.

The present invention provides the following items (1) to (3).

(1) A container for a nonaqueous electrolytic solution, comprising a material containing an aluminum or aluminum alloy layer, and storing a nonaqueous electrolytic solution containing a nonaqueous solvent having dissolved therein an electrolyte salt, the container having a cap and a plug each formed of a resin, and maintaining the nonaqueous electrolytic solution to have a water content of 50 ppm or less after storing in the container for 30 days.

(2) A nonaqueous electrolytic solution placed in a container, containing a nonaqueous solvent having dissolved therein an electrolyte salt, the container comprising a material containing an aluminum or aluminum alloy layer, having a cap and a plug each formed of a resin, and maintaining the nonaqueous electrolytic solution to have a water content of 50 ppm or less after storing in the container for 30 days.

(3) A method for storing a nonaqueous electrolytic solution in a container, the container comprising a material containing an aluminum or aluminum alloy layer, having a cap and a plug each formed of a resin, and maintaining the nonaqueous electrolytic solution to have a water content of 50 ppm or less after storing in the container for 30 days.

Advantages of the Invention

According to the present invention, a container for a nonaqueous electrolytic solution is provided that prevents the nonaqueous electrolytic solution from being decomposed on storing to maintain the high quality, and facilitates and ensures the handling of the nonaqueous electrolytic solution, and a nonaqueous electrolytic solution placed in a container, and a method for storing a nonaqueous electrolytic solution are also provided.

The container for a nonaqueous electrolytic solution of the present invention prevents the nonaqueous electrolytic solution from being decomposed on storing to maintain the high quality particularly in the case where the container stores a nonaqueous electrolytic solution containing a nonaqueous solvent containing a cyclic carbonate, having dissolved therein an electrolyte salt, and is opened and closed repeatedly twice or more, preferably three times or more, and further preferably five times or more, and has a light weight and excellent handleability.

BRIEF DESCRIPTION OF THE DRAWINGS

FIG. 2(a) shows an inner plug type, FIG. 2(b) shows an outer plug type, and FIG. 2(c) shows a cap with a circular protrusion (plug) provided.

EMBODIMENTS FOR CARRYING OUT THE INVENTION

Figure 1:
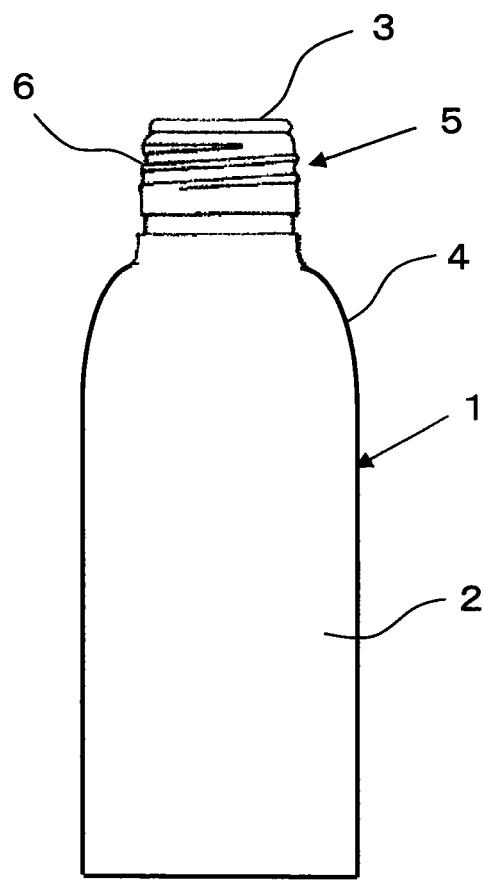
FIG. 1 is a schematic illustration showing an example of a canister of a container for a nonaqueous electrolytic solution according to the present invention.

The container for a nonaqueous electrolytic solution of the present invention is constituted by a material containing an aluminum or aluminum alloy layer, and stores a nonaqueous electrolytic solution containing a nonaqueous solvent having dissolved therein an electrolyte salt, and the container has a cap and a plug each formed of a resin, and maintains the nonaqueous electrolytic solution to have a water content of 50 ppm or less after storing in the container for 30 days.

For maintaining a nonaqueous electrolytic solution to have a water content of 50 ppm or less after storing in the container for 30 days, the container for a nonaqueous electrolytic solution of the present invention is formed of a material containing an aluminum or aluminum alloy layer and is sealed with a cap and a plug each formed of a resin.

Container for Nonaqueous Electrolytic Solution

The material for the container for a nonaqueous electrolytic solution (which may be hereinafter referred simply to as a "container") of the present invention contains an aluminum or aluminum alloy layer from the viewpoint of the corrosion resistance to a nonaqueous electrolytic solution to be charged in the container, and a pure aluminum material and a material containing an aluminum-manganese alloy layer are preferred. The material containing an aluminum or aluminum alloy layer may be a material formed of only an aluminum or aluminum alloy layer or may be a material having a laminated structure with another layer.

On using a stainless steel container, dripping may occur on taking an electrolytic solution out from the container, and the electrolytic solution is attached to the screw part at the neck portion of the container and dried to make the solute, such as an electrolyte salt, contained in the electrolytic solution to be deposited as solid matters. As a result, a large torque is required for opening the cap, and the cap is necessarily opened with a tool. A container for an electrolytic solution is opened generally in a narrow space, such as a globe box, and improvement of the workability at sites for tests, developments and the like, has been demanded. Furthermore, a gap may be formed between the cap and the neck portion of the container due to the solid matters thus deposited, which brings about a problem of accelerating deterioration of the nonaqueous electrolytic solution.

In the aluminum container for a nonaqueous electrolytic solution of the present invention, on the other hand, the container body is largely reduced in weight and has a good balance in strength over the container, and thus a cap formed of a resin may be used. As a result, even though a certain amount of deposits are attached to the screw part at the neck portion of the container, the torque for opening the cap is not increased, the good handleability is maintained for a prolonged period of time, the container can be used repeatedly, and the nonaqueous electrolytic solution can be prevented from being deteriorated.

By controlling the water content of the nonaqueous electrolytic solution precisely, the corrosion resistance of the container formed of a material containing a pure aluminum material layer or a material containing an aluminum-manganese alloy layer is further enhanced.

The pure aluminum material preferably has a purity of 99% or more for good corrosion resistance, and more preferably has a purity of 99.5% or more, and further preferably 99.7% or more. Preferred specific examples of the pure aluminum material include JIS 1000 series materials, such as 1050 (purity: 99.50% or more), 1060, 1070 (purity: 99.70% or more), 1080 (purity: 99.80% or more), 1085 (purity: 99.85% or more), 1100 (purity: 99.00% or more), 1200 (purity: 99.00% or more) and 1N00.

The aluminum-manganese alloy has corrosion resistance and larger strength than the pure aluminum material, and thus is preferred as a material demanded to have strength.

The aluminum (Al))-manganese (Mn) alloy may be an Al—Mn binary alloy, and may be an Al—Mn—X ternary or higher alloy containing at least one additional element X, such as copper, silicon, magnesium and zinc. In any cases, the content of manganese in the alloy may be from 0.2 to 10% by mass, preferably from 0.5 to 5% by mass, and more preferably from 0.8 to 3% by mass, from the viewpoint of the strength and the corrosion resistance.

Preferred specific examples of the aluminum-manganese alloy include JIS 3000 series materials, such as 3003, 3004, 3005, 3104, 3105 and 3203.

After shaping aluminum or the aluminum alloy into a container, or after further polishing the surface of the container, the corrosion resistance of the container is preferably enhanced by allowing the container to stand in the air to form a spontaneous oxide film, by forming an oxide film with an oxidizing agent, or by forming a fluoride film.

Examples of the oxidizing agent for oxidizing the surface of aluminum or the aluminum alloy include a gas containing at least one selected from oxygen, ozone, nitrous oxide and nitrogen peroxide, and a mixed gas of the gas with an inert gas, such as nitrogen and argon.

Examples of the fluorinating agent for forming a fluoride film on the surface of aluminum or the aluminum alloy include a gas containing at least one selected from fluorine, nitrogen fluoride and chlorine trifluoride, and a mixed gas of the gas with an inert gas, such as nitrogen and argon.

An oxide film or a fluoride film may be formed on the surface of the container by retaining aluminum or the aluminum alloy in the gas or gas stream, for example, at a temperature of from 100 to 600° C. for from 0.1 to 24 hours.

Other aluminum alloys than the aluminum-manganese alloy may be used after coating a synthetic resin or the like having good corrosion resistance in the form of a film on the inner surface of the container. Examples of the synthetic resin include a thermoplastic resin, for example, a polyolefin, such as polyethylene (PE) and polypropylene (PP), a polyester, such as polyethylene terephthalate (PET), and a polyamide, such as nylon (NY), a fluorine resin, such as polytetrafluoroethylene (Teflon, a trade name), an ethylene-propylene dimer (EPDM), an ethylene-propylene tetramer (EPT), and a perfluoro elastomer. The thickness of film used is preferably from 5 to 50 μm, and more preferably from 10 to 30 μm.

The shape of the container is not particularly limited, and may be an arbitrary shape including a bottle type, a cylinder type, an aluminum-laminated paper bag type, an aluminum pouch type or the like.

The bottle type container may have an arbitrary horizontal cross sectional shape including a circular shape and a polygonal shape, such as triangular to octagonal shapes. Among these, a circular horizontal cross sectional shape is preferred from the viewpoint of the strength and the processability of the container. The cross sectional area of the container may be continuously changed in the vertical direction. For example, the cross sectional area around the center of the container in the height direction may be smaller than the cross sectional areas in the vicinities of the ends of the container, thereby forming a constricted shape having the container body that is partly narrowed, or a surface concavo-convex structure may be formed on the container, thereby forming a structure facilitating grasp of the container.

The aluminum-laminated paper bag type container may have a rectangular columnar shape having a rectangular horizontal cross sectional shape of the container or the like. The structure of the aluminum-laminated paper is preferably a multilayer structure containing a resin layer 1, an aluminum or aluminum alloy layer, a resin layer 2, a paper layer, and a resin layer 3, which are laminated in this order from the side in contact with the nonaqueous electrolytic solution (i.e., the inner side). Examples of the resin layer 1 include a polyolefin layer, such as PE and PP, and/or a polyester layer, such as PET, and examples of the resin layer 2 and the resin layer 3 include a polyolefin layer, such as PE and PP. The paper used in the paper layer is not particularly limited, and examples thereof include Manila paper board and white paper board, which are used as a paper board for a paper container.

The aluminum pouch type container preferably has a multilayer structure containing a resin layer, such as a polyolefin, e.g., PP, a polyester, e.g., PET, and a polyamide, e.g., NY, and an aluminum layer or an aluminum alloy layer, which are laminated on one another, and is preferably in the form of a standing pouch.

Among these, a bottle type container is preferred due to the good handleability thereof.

FIG. 1 is a schematic illustration showing an example of a canister as a body of a bottle type container according to the present invention. The canister 1 has a bottom portion having a disk shape (which is not shown in the figure), a canister body 2 having a cylindrical shape having a lower end that is connected to the periphery of the bottom portion, a skirt wall 4 that is provided above the canister body 2, and a neck portion 5 that is provided above the skirt wall 4. A screw part 6 is provided on the outer peripheral surface of the neck portion 5 to form a liquid charging port 3 at the upper edge of the neck portion 5.

The canister body 2 may be formed, for example, by rolling up an aluminum or aluminum alloy thin plate having a thickness of from 0.2 to 1.0 mm, preferably from 0.2 to 0.6 mm, and more preferably from 0.3 to 0.5 mm, into a cylindrical shape, and welding the overlapping portions thereof integrally. The canister body 2 may have an inner coated film formed of a synthetic resin provided on the inner surface thereof depending on necessity. The material for the inner coated film is not particularly limited as far as it causes no dissolution to the nonaqueous electrolytic solution.

The canister body 2 has a straight outer shape having a substantially constant shape over the entire length thereof. The canister body 2 has on the uppermost position the neck portion 5 provided through the skirt wall 4, and the neck portion 5 has at the upper edge the liquid charging port 3. The liquid charging port 3 is sealed with a plug (which is not shown in the figure).

The skirt wall 4 has a smoothly curved cylindrical shape with a taper having a diameter that is decreased toward the above along the central axis of the canister body 2. The inclination angle of the skirt wall 4, i.e., an angle with respect to the line that is perpendicular to the central axis of the canister body 2, is preferably in a range of from 20 to 50°, and more preferably from 25 to 45°, from the viewpoint of the mechanical strength of the canister 1.

An external screw for screwing on a screw part of a cap (which is not shown in the figure) is provided on the outer peripheral surface of the neck portion 5. The screw is not particularly limited, and may be a screw formed of protrusions or depressions around the neck portion 5 or a screw formed of protruded threads or depressed grooves that are discontinuously formed, and the screw may have an arbitrary number of thread. Instead of the external screw formed on the outer peripheral surface of the neck portion 5, an inner screw for screwing on a screw part of a cap (which is not shown in the figure) may be provided on the inner peripheral surface of the neck portion 5, and in this case, a cap has formed thereon an external screw that is screwed on the inner screw formed on the inner peripheral surface of the neck portion 5.

The container for a nonaqueous electrolytic solution of the present invention stores a nonaqueous electrolytic solution thereinside by sealing with cap, and a plug is used for maintaining securely the airtightness of the container and preventing securely leakage of the nonaqueous electrolytic solution charged in the container, thereby maintaining the nonaqueous electrolytic solution to have high quality for a prolonged period of time, and for maintaining the good handleability.

Specifically, the materials for the cap and the plug and the structure of the neck portion 5 may be determined to maintain the sealed state, for maintaining the nonaqueous electrolytic solution to have a water content of 50 ppm or less after storing in the container for 30 days, preferably for maintaining the nonaqueous electrolytic solution to have an acid content of 50 ppm or less in terms of hydrogen fluoride (HF) after storing in the container for 30 days as described later, for maintaining the change in acid content of the nonaqueous electrolytic solution within ±20 ppm or less in terms of HF after storing in the container for 30 days, and for maintaining the nonaqueous electrolytic solution to have an APHA value of 50 or less.

Figure 2:
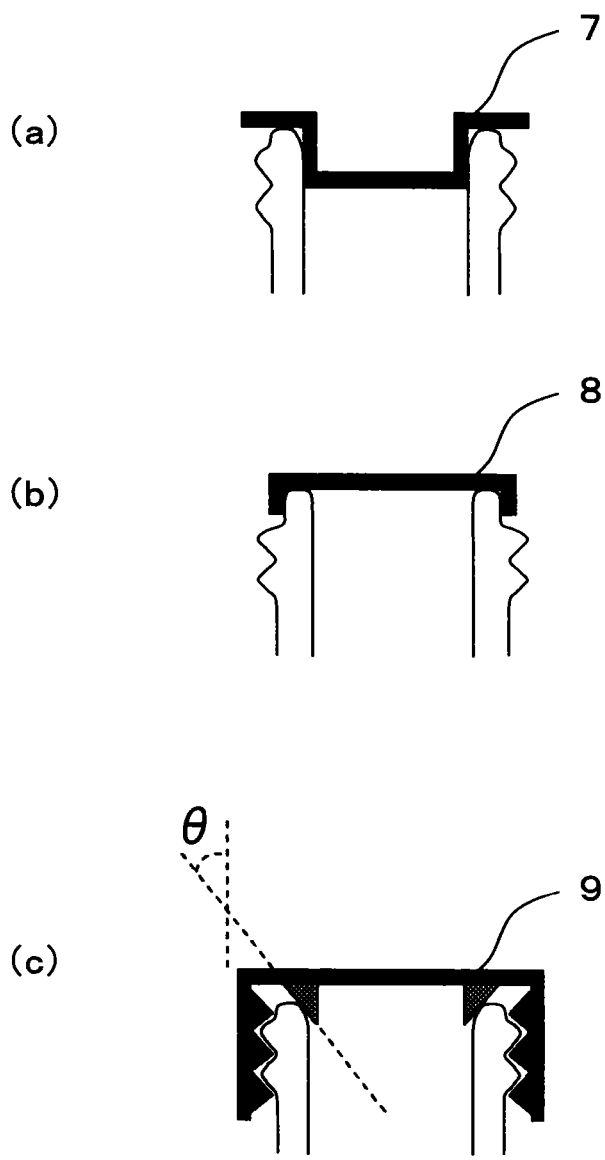
FIG. 2(a) to FIG. 2(c) are schematic illustrations showing examples of plugs and caps of a container for a nonaqueous electrolytic solution according to the present invention.

FIG. 2(a) to FIG. 2(c) are schematic illustrations showing examples of plugs and caps of the container for a nonaqueous electrolytic solution according to the present invention. FIG. 2(a) shows an inner plug type, FIG. 2(b) shows an outer plug type, and FIG. 2(c) shows a cap with a circular protrusion (plug) provided.

As shown in FIG. 2(a) and FIG. 2(b), the plug may be separated from the cap, and thus may be an inner plug 7, which is inserted inside the liquid charging port, or an outer plug 8, which is capped outside the liquid charging port. The outer plug 8 is preferred rather than the inner plug 7 since the outer plug has less occasions to be in contact with the nonaqueous electrolytic solution, thereby facilitating the maintenance of the sealing property. Furthermore, the plug preferably has a handle or the like for facilitating detachment.

In the case where the plug is an inner plug 7, on inserting the inner plug 7 into the liquid charging port, the side wall of the inner plug 7 may be slanted in such a manner that the outer diameter at the end thereof, which is in contact with the inner side of the liquid charging port, may be smaller than the inner diameter of the liquid charging port. Furthermore, the end may have a notch or a curved surface, which is preferred since the insertion of the inner plug 7 into the liquid charging port may be facilitated.

As shown in FIG. 2(c), the plug may be in the form of a circular protrusion attached to the cap, i.e., in the form integrated with the cap, which is capable of sealing by contacting with the inner wall of the liquid charging port on closing the cap. The cap 9 having the circular protrusion (plug) attached thereto enhances the sealing property of the container, and prevents more effectively the low boiling point solvent contained in the nonaqueous electrolytic solution from being volatilized, and water from being mixed therein from the outside of the container. The circular protrusion attached to the cap is preferably provided in such a manner that the surface (outer wall) thereof in contact with the inner wall of the liquid charging port is slanted with respect to the inner wall of the liquid charging port, and the slant angle θ is preferably from 0.5 to 45°, and more preferably from 1 to 30°.

The inner plug 7 or the outer plug 8, in which the plug is provided separately from the cap, is preferred rather than the cap 9 having the circular protrusion (plug) attached thereto since it provides less occasions of the cap to be in contact with the nonaqueous electrolytic solution, thereby facilitating the maintenance of the sealing property.

The liquid charging port of the container may be in the form of a cylinder having an outer diameter that is smaller than the diameter of the body of the container. A notch or a depressed portion may be provided in the cylindrical liquid charging port to form a shape that prevents dripping.

A circular dripping preventing member that is provided in a commercially available storing bottle (such as Duran (a trade name) bottle) may be provided, and thereby the electrolytic solution after discharging may be prevented from flowing by dropping to the neck portion and the screw part of the container.

The dimensional ratio of the liquid charging port and the plug, which is the ratio (inner diameter of liquid charging port)/(outer diameter of plug) for the combination of the circular cap and the inner plug or the ratio (inner diameter of plug)/(outer diameter of liquid charging port) for the combination of the circular cap and the outer plug, is preferably from 0.920 to 0.995. The lower limit of the dimensional ratio is more preferably 0.940 or more, and further preferably 0.960 or more, and the upper limit thereof is more preferably 0.993 or less, and further preferably 0.990 or less.

When the dimensional ratio is less than 0.920, a certain force may be required for attaching the cap or detaching the cap or the plug due to solid matters attached, dried and deposited on the neck portion and the screw part of the container, which may significantly deteriorate the workability in some cases. When the dimensional ratio exceeds 0.995, on the other hand, the sealing property of the container may be lowered, which may facilitate volatilization of the low boiling point solvent contained in the nonaqueous electrolytic solution and contamination with water from the outside of the container, thereby failing to maintain the nonaqueous electrolytic solution to have high quality for a prolonged period of time in some cases.

The materials for the cap and the plug are not particularly limited as far as they are such a material that does not elute the components of the material even when the material is temporarily in contact with the nonaqueous electrolytic solution, and has sealing property and durability as a cap or a plug, and resin and metal materials may be used. Among these, from the viewpoint of the sealing property and the handleability the cap is preferably formed of a relatively rigid synthetic resin having large mechanical strength, for example, a polypropylene resin and a high density polyethylene resin.

The plug is generally substantially not in contact with the nonaqueous electrolytic solution as the content of the container, and thus the material of the plug is substantially not eluted into the nonaqueous electrolytic solution, as compared to elution of the material of the container into the nonaqueous electrolytic solution. Accordingly, from the viewpoint of the sealing property, the durability and the handleability, the plug is preferably formed of a relatively soft synthetic resin having smaller mechanical strength than the synthetic resin used for the cap, for example, a polyethylene resin, such as low density polyethylene (LDPE) and linear low density polyethylene (LLDPE), and a fluorine resin, such as polytetrafluoroethylene (PTFE), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polyvinylidene fluoride (PVDF) and polychlorotrifluoroethylene (PCTFE).

The capacity of the container is not particularly limited, but is preferably from 10 to 200,000 $cm^3$, more preferably from 20 to 30,000 $cm^3$, further preferably from 50 to 1,000 $cm^3$, and particularly preferably from 100 to 500 $cm^3$, from the viewpoint of the handleability. The body diameter of the container is not particularly limited, but is preferably from 50 to 150 mm, and more preferably from 60 to 100 mm, from the viewpoint of the handleability.

On charging the nonaqueous electrolytic solution in the container, the charging ratio thereof is preferably from 20 to 98%, more preferably from 30 to 97%, and further preferably from 50 to 95%, of the capacity of the container. When the charging ratio is less than 20%, volatilization of the low boiling point solvent in the nonaqueous electrolytic solution may be facilitated to increase the concentration of the high boiling point solvent, and thus solid matters may be deposited on the neck portion or the screw part, which may deteriorate the sealing property. When the charging ratio exceeds 98%, on the other hand, the cap may be liable to be in contact with the nonaqueous electrolytic solution, or the inner pressure in the container may be increased to deteriorate the sealing property. Accordingly, the charging ratio is preferably within the aforementioned range. The nonaqueous electrolytic solution is preferably charged in such a manner that the upper surface of the nonaqueous electrolytic solution is lower than the liquid charging port by 1 cm or more, more preferably 2 cm or more, and further preferably 3 cm or more.

Nonaqueous Solvent

Examples of the nonaqueous solvent used in the nonaqueous electrolytic solution of the present invention include a cyclic carbonate, a linear ester, a lactone, an ether, an amide, a nitrile, a phosphate ester, an S=O bond-containing compound, a carboxylic acid anhydride and an aromatic compound.

The nonaqueous solvent preferably contains a cyclic carbonate, and more preferably contains a cyclic carbonate and a linear ester, from the viewpoint of effective expression of the advantages of the present invention.

The term "linear ester" herein means a concept including a linear carbonate and a linear carboxylate ester.

The nonaqueous solvent may be used solely or as a combination of two or more kinds thereof.

Cyclic Carbonate

Preferred examples of the cyclic carbonate include ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (which are hereinafter referred to as DFEC as a generic term), vinylene carbonate (VC), and vinylethylene carbonate (VEC).

Among these, a cyclic carbonate containing at least one selected from EC, PC and a cyclic carbonate containing a carbon-carbon double bond or a fluorine atom is preferred, the use of at least one of EC and/or PC and a cyclic carbonate containing a carbon-carbon double bond or a fluorine atom is more preferred for further enhancing the battery characteristics, and it is particularly preferred that EC and/or PC, and both a cyclic carbonate containing a carbon-carbon double bond and a cyclic carbonate containing a fluorine atom are contained. Preferred examples of the cyclic carbonate containing a carbon-carbon double bond include VC and VEC, and preferred examples of the cyclic carbonate containing a fluorine atom include FEC and DFEC.

Preferred specific examples of the combination of the cyclic carbonates include EC and VC; FEC and PC; DFEC and PC; EC, FEC and PC; EC, FEC and VC; and EC, VC and VEC.

The content of the cyclic carbonate is not particularly limited, but is preferably from 0 to 40% by volume of the total volume of the nonaqueous solvent. When the content exceeds 40% by volume, the viscosity of the nonaqueous electrolytic solution may be increased in some cases, and thus the content is preferably within the range.

Linear Ester

Examples of the linear ester include an asymmetric linear carbonate, such as methyl ethyl carbonate (MEC), methyl propyl carbonate, methyl isopropyl carbonate, methyl butyl carbonate and ethyl propyl carbonate, a symmetric linear carbonate, such as dimethyl carbonate (DMC), diethyl carbonate (DEC), dipropyl carbonate and dibutyl carbonate, and a linear carboxylate ester, such as methyl acetate, ethyl acetate, methyl propionate, ethyl propionate, methyl pivalate, butyl pivalate, hexyl pivalate, octyl pivalate, dimethyl oxalate, ethyl methyl oxalate and diethyl oxalate.

The use of an asymmetric linear carbonate contained is preferred since there may be a tendency of enhancing the battery characteristics, such as the storage property, and the combination use of an asymmetric linear carbonate and a symmetric linear carbonate is more preferred. The proportion of the asymmetric linear carbonate contained in the linear carbonate is preferably 50% by volume or more. The asymmetric linear carbonate preferably contains a methyl group, and is more preferably MEC.

The content of the linear ester, particularly the linear carbonate, is not particularly limited, but is preferably in a range of from 60 to 100% by volume based on the total volume of the nonaqueous solvent. When the content is less than 60% by volume, the viscosity of the nonaqueous electrolytic solution may be increased in some cases, and thus the content is preferably within the range.

The ratio of the cyclic carbonate and the linear ester (linear carbonate) is preferably that the volume ratio (cyclic carbonate)/(linear ester) is from 10/90 to 40/60, more preferably from 15/85 to 35/65, and further preferably from 20/80 to 30/70 from the viewpoint of enhancing the battery characteristics, such as the storage property.

Other Nonaqueous Solvents

Examples of the lactone include γ-butyrolactone (GBL), γ-valerolactone and α-angelicalactone, examples of the ether include a cyclic ether, such as tetrahydrofuran, 2-methyltetrahydrofuran, 1,3-dioxolane, 1,3-dioxane and 1,4-dioxane, and a linear ether, such as 1,2-dimethoxyethane (DME), 1,2-diethoxyethane and 1,2-dibutoxyethane, examples of the amide include dimethylformamide and the like, examples of the nitrile include acetonitrile, propionitrile, succinonitrile, glutaronitrile, adiponitrile and pimelonitrile, and examples of the phosphate ester include trimethyl phosphate, tributyl phosphate and trioctyl phosphate.

Examples of the S=O bond-containing compound include a sultone compound, such as 1,3-propanesultone 1,3-butanesultone, and 1,4-butanesultone, acyclic sulfite compound, such as ethylene sulfite, 1,2-cyclohexanediol cyclic sulfite and 5-vinyl-hexahydro-1,3,2-benzodioxathiol-2-oxide, a sulfonate ester compound, such as 1,2-ethanediol dimethanesulfonate, 1,2-propanediol dimethanesulfonate, 1,3-propanediol dimethanesulfonate, 1,4-butanediol dimethanesulfonate, 1,5-pentanediol dimethanesulfonate and 2-propynyl methanesulfonate, a vinyl sulfone compound, such as divinyl sulfone, 1,2-bis(vinylsulfonyl)ethane and bis(2-vinylsulfonylethyl)ether, and sulfolane and the like.

Examples of the carboxylic acid anhydride include a linear carboxylic acid anhydride, such as acetic anhydride and propionic anhydride, and, a cyclic carboxylic acid anhydride, such as succinic anhydride, maleic anhydride, glutaric anhydride and itaconic anhydride.

Examples of the aromatic compound include cyclohexylbenzene, a fluorocyclohexylbenzene compound (such as 1-fluoro-2-cyclohexylbenzene, 1-fluoro-3-cyclohexylbenzene and 1-fluoro-4-cyclohexylbenzene), an aromatic compound having a branched alkyl group, such as tert-butylbenzene, tert-amylbenzene and 1-fluoro-4-tert-butylbenzene, biphenyl, terphenyl (o-, m- and p-forms), diphenyl ether, fluorobenzene, difluorobenzene (o-, m- and p-forms), anisole, 2,4-difluoroanisole, and a partially hydrogenated compound of terphenyl (such as 1,2-dicyclohexylbenzene, 2-phenylbicyclohexyl, 1,2-diphenylcyclohexane and o-cyclohexylbiphenyl).

Among the aforementioned compounds, a solvent that is in a solid state at ordinary temperature is preferably contained since the advantages of the present invention may be further exhibited, and in particular, ethylene carbonate and/or vinylene carbonate are/is more preferably contained.

Electrolyte Salt

Preferred examples of the electrolyte salt used in the present invention include the following lithium salts and onium salts.

Lithium Salt

Preferred examples of the lithium salt include an inorganic lithium salt, such as $LiPF_6$, $LiPO_2F_2$, $Li_2PO_3F$, $LiBF_4$ and $LiClO_4$, a lithium salt containing a linear fluorinated alkyl group, such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_7)$, a lithium salt having a cyclic fluorinated alkylene group, such as $(CF_2)_2(SO_2)_2NLi$ and $(CF_2)_3(SO_2)_2NLi$, and a lithium salt with an oxalate complex as an anion, such as bis(oxalate-O,O') lithium borate and difluoro(oxalate-O,O') lithium borate, which may be used solely or as a mixture of two or more thereof. Among these, at least one selected from $LiPF_6$, $LiPO_2F_2$, $Li_2PO_3F$, $LiBF_4$, $LiN(SO_2CF_3)_2$ and $LiN(SO_2C_2F_5)_2$ is preferred, and at least one selected from $LiPF_6$, $LiPO_2F_2$, $LiBF_4$ and $LiN(SO_2CF_3)_2$ is more preferred.

Onium Salt

Preferred examples of the onium salt include various salts formed by combining the following onium cations and anions.

Specific preferred examples of the onium cation include tetramethylammonium cation, ethyltrimethylammonium cation, diethyldimethylammonium cation, triethylmethylammonium cation, tetraethylammonium cation, N,N-dimethylpyrrolidinium cation, N-ethyl-N-methylpyrrolidinium cation, N,N-diethylpyrrolidinium cation, spiro-(N,N')-bipyrrolidinium cation, N,N'-dimethylimidazolinium cation, N-ethyl-N'-methylimidazolinium cation, N,N'-diethylimidazolinium cation, N,N'-dimethylimidazolium cation, N-ethyl-N'-methylimidazolium cation and N,N'-diethylimidazolium cation.

Specific preferred examples of the anion include $PF_6$ anion, $BF_4$ anion, $ClO_4$ anion, $AsF_6$ anion, $CF_3SO_3$ anion, $N(CF_3SO_2)_2$ anion and $N(C_2F_5SO_2)_2$ anion.

These electrolyte salts may be used solely or as a combination of two or more kinds thereof.

Among the aforementioned salts, a salt that is in a solid state at ordinary temperature is preferably contained since the advantages of the present invention may be further exhibited, and in particular, at least one selected from $LiPF_6$, $LiPO_2F_2$ and $LiBF_4$ is more preferably contained since the electrolyte salt has such a tendency that the electrolyte salt is reacted with water to form a deposit attached to the neck portion of the container.

The lower limit of the concentration of the electrolyte salt used after dissolving in the nonaqueous electrolytic solution is preferably 0.3 M or more, more preferably 0.5 M or more, and further preferably 0.8 M or more. The upper limit thereof may vary depending on the kind of the electrolyte salt and the combination with the nonaqueous solvent, but the electrolyte salt may be used up to a high concentration of the electrolyte salt that reaches saturation with respect to the nonaqueous solution. The upper limit is preferably 4 M or less, more preferably 3 M or less, and further preferably 2 M or less.

Nonaqueous Electrolytic Solution

The nonaqueous electrolytic solution of the present invention is placed in a container that is charged with a nonaqueous electrolytic solution containing a nonaqueous solvent and an electrolyte salt dissolved therein, and the container is formed of aluminum or aluminum alloy, has a cap and a plug each formed of a resin, and maintains the nonaqueous electrolytic solution to have a water content of 50 ppm or less after storing in the container for 30 days.

The nonaqueous electrolytic solution may be obtained, for example, by dissolving the electrolyte salt in the nonaqueous solvent at a concentration of from 0.3 to 4 M.

At this time, the nonaqueous solvent and the compounds to be added to the nonaqueous electrolytic solution are preferably purified in advance in such an extent that the productivity is not considerably impaired, and those containing impurities in small amounts as possible are preferably used.

Water Content of Nonaqueous Electrolytic Solution

In the present invention, the water content of the nonaqueous electrolytic solution on storing in the container is controlled in advance to be maintained to preferably 50 ppm or less, more preferably 30 ppm or less, more preferably 25 ppm or less, and further preferably 15 ppm or less.

The water content of the nonaqueous electrolytic solution after storing in the container for 30 days is controlled in advance to be maintained to preferably 50 ppm or less, more preferably 40 ppm or less, further preferably 25 ppm or less, and particularly preferably 15 ppm or less.

The water content of the nonaqueous electrolytic solution after storing in the container for 60 days is controlled in advance to be maintained to preferably 50 ppm or less, more preferably 40 ppm or less, more preferably 25 ppm or less, and further preferably 15 ppm or less.

The water content of the nonaqueous electrolytic solution after storing in the container for 180 days is controlled in advance to be maintained to preferably 50 ppm or less, more preferably 40 ppm or less, further preferably 25 ppm or less, and particularly preferably 15 ppm or less.

The water content of the nonaqueous electrolytic solution may be measured with a Karl Fischer water content measuring equipment.

The change in water content of the nonaqueous electrolytic solution after 30 days from the time point of storing in the container may be maintained to ±15 ppm, preferably ±10 ppm, and more preferably ±5 ppm.

The change in water content of the nonaqueous electrolytic solution after 60 days from the time point of storing in the container is maintained to preferably ±20 ppm, more preferably ±15 ppm, and further preferably ±10 ppm.

The change in water content of the nonaqueous electrolytic solution after 180 days from the time point of storing in the container is maintained to preferably ±30 ppm, more preferably ±20 ppm, and further preferably ±10 ppm.

Acid Content of Nonaqueous Electrolytic Solution

The acid content of the nonaqueous electrolytic solution on storing in the container is preferably 100 ppm or less, more preferably 50 ppm or less, further preferably 30 ppm or less, and particularly preferably 25 ppm or less, in terms of hydrogen fluoride (HF).

The acid content of the nonaqueous electrolytic solution after 30 days from the time point of storing in the container is preferably 100 ppm or less, more preferably 50 ppm or less, further preferably 30 ppm or less, and particularly preferably 25 ppm or less, in terms of HF.

The acid content of the nonaqueous electrolytic solution after storing in the container for 60 days is preferably 100 ppm or less, more preferably 50 ppm or less, further preferably 30 ppm or less, and particularly preferably 25 ppm or less, in terms of HF.

The acid content of the nonaqueous electrolytic solution after storing in the container for 180 days is preferably 100 ppm or less, more preferably 50 ppm or less, further preferably 30 ppm or less, and particularly preferably 25 ppm or less, in terms of HF.

The change in acid content of the nonaqueous electrolytic solution after 30 days from the time point of storing in the container is preferably ±20 ppm, more preferably ±15 ppm, further preferably ±10 ppm, and particularly preferably ±5 ppm.

The acid content of the nonaqueous electrolytic solution may be measured with a 0.01 N—NaOH aqueous solution as a titrant and a bromthymol blue (BTB) solution as an indicator by using, for example, an automatic titrator (TS-980, a trade name, produced by Hiranuma Sangyo Corporation), and the measured value is converted into a value in terms of HF to provide the acid content.

APHA Value of Nonaqueous Electrolytic Solution

The APHA value of the nonaqueous electrolytic solution on storing in the container is preferably 150 or less, preferably 100 or less, more preferably 50 or less, and further preferably 30 or less.

The Hazen color unit (APHA value) of the nonaqueous electrolytic solution after 30 days from storing in the container is preferably 150 or less, more preferably 100 or less, more preferably 50 or less, and further preferably 30 or less.

The APHA value of the nonaqueous electrolytic solution after storing in the container for 60 days is preferably 150 or less, preferably 100 or less, more preferably 50 or less, and further preferably 30 or less.

The APHA value of the nonaqueous electrolytic solution after storing in the container for 180 days is preferably 150 or less, preferably 100 or less, more preferably 50 or less, and further preferably 30 or less.

The APHA value may be measured in such a manner that the standard solution that has the closest concentration to that of the specimen is obtained according to JIS K6901, and the number of the standard solution is designated as the APHA value.

Method for storing Nonaqueous Electrolytic Solution

The method for storing a nonaqueous electrolytic solution of the present invention is a method for storing a nonaqueous electrolytic solution in a container, and the container is formed of a material containing aluminum or aluminum alloy, has a cap and a plug each formed of a resin, and maintains the nonaqueous electrolytic solution to have a water content of 50 ppm or less after storing in the container for 30 days.

The temperature on storing a nonaqueous electrolytic solution is preferably from 0 to 60° C., more preferably from 10 to 50° C., and further preferably from 20 to 45° C., from the viewpoint of corrosion prevention.

The other details are as shown above.

Application of Nonaqueous Electrolytic Solution

The nonaqueous electrolytic solution of the present invention may be used as a nonaqueous electrolytic solution for electrochemical element, for example, a lithium battery (such as a lithium primary battery and a lithium secondary battery), an electric double layer capacitor (which is an electrochemical element storing energy by utilizing an electric double layer capacitance at an interface between an electrolytic solution and an electrode), an electrochemical element storing energy by utilizing doping/dedoping reaction of an electrode, and a lithium ion capacitor (which is an electrochemical element storing energy by utilizing intercalation of lithium ion to a carbon material, such as graphite, as a negative electrode). Furthermore, the nonaqueous electrolytic solution of the present invention may be used for a solid polymer electrolyte.

Among these, the nonaqueous electrolytic solution is preferably used for the first electrochemical element (i.e., for a lithium battery), and is most preferably used for a lithium secondary battery.

EXAMPLES

Examples of the present invention are shown below, but the present invention is not limited to the examples.

Preparation Example 1

Preparation of Nonaqueous Electrolytic Solution

A nonaqueous solvent having a ratio of ethylene carbonate (EC)/methyl ethyl carbonate (MEC) of 3/7 (volume ratio) was prepared, and $LiPF_6$ as an electrolyte salt was dissolved therein to a concentration of 1 M, thereby preparing a nonaqueous electrolytic solution.

Example 1

The nonaqueous electrolytic solution obtained in Preparation Example 1 was stored in a 1,000 $cm^3$ container formed of aluminum having a purity of 99.5% (JIS 1050) (having a cap formed of a polypropylene resin, a plug formed of low density polyethylene, an inner diameter of a liquid charging port of 28.0 mm, and an outer diameter of the inner plug of 29.0 mm), stored at 25° C. for 180 days, and measured for water content and acid content before storing and with the lapse of time by the above-mentioned method. The results are shown in Table 1.

Example 2

The same operation was performed as in Example 1 except that the storing temperature was changed to 40° C. The results are shown in Table 1.

Example 3

The same operation was performed as in Example 1 except that 2% by mass of 1,3-propanesultone was further added to the nonaqueous electrolytic solution obtained in Preparation Example 1 to prepare a nonaqueous electrolytic solution. The results are shown in Table 1.

Comparative Examples 1 and 2

The same operation was performed as in Example 1 except that the storing containers were changed to one formed of stainless steel (produced by Wada Stainless Industry Co., Ltd., 1,000 $cm^3$) and one formed of polypropylene (PP) (produced by AS ONE Corporation, 1,000 $cm^3$) respectively. The results are shown in Table 1.

TABLE 1

|  | Example 1 | | | Example 2 | | | Example 3 | | | Comparative Example 1 | | | Comparative Example 2 | | |
| --- | --- | --- | --- | --- | --- | --- | --- | --- | --- | --- | --- | --- | --- | --- | --- |
| Material of container for electrolytic solution | aluminum purity: 99.5% (JIS 1050) | | | aluminum purity: 99.5% (JIS 1050) | | | aluminum purity: 99.5% (JIS 1050) | | | stainless steel | | | PP | | |
| Mass of container (g) | 101 | | | 101 | | | 101 | | | 650 | | | 83 | | |
| Storing temperature (° C.) | 25 | | | 40 | | | 25 | | | 25 | | | 25 | | |
| Elapsed number of days (day) | 0 | 30 | 180 | 0 | 30 | 180 | 0 | 30 | 180 | 0 | 30 | 180 | 0 | 30 | 180 |
| Water content (ppm) | 6 | 4 | 5 | 6 | 5 | 5 | 6 | 4 | 5 | 6 | 4 | 5 | 6 | 8 | 8 |
| Acid content (ppm) | 7 | 19 | 24 | 7 | 20 | 26 | 7 | 20 | 26 | 7 | 21 | 28 | 7 | 51 | 123 |
| APHA value *1 | <10 | 10 | 10 | <10 | 10 | 20 | <10 | 10 | 10 | <10 | 10 | 20 | <10 | 20 | 40 |
| Elution of material | none | none | none | none | none | none | none | none | none | none | none | none | none | present | present |

*1: "<10" shows "less than 10".

The nonaqueous electrolytic solutions stored under the conditions in Examples 1 and 2 maintained good quality without elution of the material of the container, and the electrochemical characteristics of the lithium secondary batteries using the stored nonaqueous electrolytic solutions were not impaired. The containers had a light weight and thus were markedly enhanced in handleability. In Comparative Example 1, on the other hand, the mass of the container was 6.5 times larger than the mass of the container of the present invention and thus handleability of the container of comparative example 1 was inferior to the containers of Examples 1 and 2.

In the nonaqueous electrolytic solution stored under the conditions of Comparative Example 2, the material of the container was eluted in the electrolytic solution, and as a result of UV spectrum measurement of the electrolytic solution with a spectrophotometer (UV2400PC, produced by Shimadzu Corporation), UV peaks derived from an aromatic additive component were detected. The elution amount thereof was increased with the lapse of the number of days, and the electrochemical characteristics of the lithium secondary battery using the stored nonaqueous electrolytic solution was affected thereby.

Examples 4 to 9 and Comparative Example 3

(1) Operation 1

As a nonaqueous solvent component, ethylene carbonate (EC), vinylene carbonate (VC), methyl ethyl carbonate (MEC), γ-butyrolactone (GBL) and 1,2-dimethoxyethane (DME) were prepared, and as an electrolyte salt, $LiPF_6$ and $LiBF_4$ were prepared, with which nonaqueous electrolytic solutions having the compositions shown in Table 2 were prepared.

A container formed of aluminum having a purity of 99.5% (JIS 1050) (internal capacity: 1,000 cm³, inner diameter of liquid charging port: 28.0 mm) or a container formed of stainless steel (produced by Wada Stainless Industry Co., Ltd., 1,000 cm³) was placed in a globe box controlled to have a dew point of −60° C. or less, and 900 mL or 400 mL of the nonaqueous electrolytic solutions having various compositions were charged therein and firmly sealed with a plug formed of polyethylene (PE) (i.e., an inner plug having an outer diameter of 29.0 mm or 28.3 mm or an outer plug having an inner diameter of 31.0 mm, provided that no plug was used for the stainless steel container) and a cap formed of polypropylene (PP) or a cap formed of stainless steel. Immediately thereafter, the cap and the plug were opened, and the nonaqueous electrolytic solution in the container was collected with a pipette and measured for the HF concentration, the $H_2O$ concentration and the APHA value of the nonaqueous electrolytic solution. The results are shown in Table 2.

(2) Operation 2

(Assumption of Spill of Electrolytic Solution)

Approximately 1 mL of the nonaqueous electrolytic solution was collected, and attached around the outer periphery of the screw part of the aluminum container or the stainless steel container, followed by wiping with a cloth. The nonaqueous electrolytic solution was then sealed in the aluminum container or the stainless steel container with the plug (provided that no plug was used for the stainless steel container) and the cap, and the aluminum container or the stainless steel container was taken out from the globe box and stored in a thermo-hygrostat chamber at 60° C. and a humidity of 40% for one week. Thereafter, the aluminum container or the stainless steel container was again placed in the globe box. Immediately thereafter, the cap and the plug (provided that no plug was used for the stainless steel container) were opened, and the nonaqueous electrolytic solution in the container was collected and measured for the HF concentration, the $H_2O$ concentration and the APHA value of the nonaqueous electrolytic solution. At this time, such an operation was performed that 1 mL of the nonaqueous electrolytic solution was attached to the screw part and then wiped.

Thereafter, the operation 2 was further repeated twice. The results are shown in Table 2.

In Table 2, the level of opening and closing properties of the cap was evaluated according to the following standard.

level 1: capable of opening and closing by hand reasonably level 2: capable of opening and closing by hand with certain force level 3: difficult to open or close by hand, and opened or closed with tool As a result of analysis of the solid matter attached to the outer periphery of the screw part of the container of Comparative Example 3, the solid matter was a mixture of decomposition products, which were considered to be derived from $LiPF_6$ or $LiBF_4$, ethylene carbonate and vinylene carbonate.

TABLE 2

| | Material of container for electrolytic solution | Weight of container (g) | Form of cap | Dimension, etc. | Composition of electrolyte salt Composition of nonaqueous electrolytic solution (volume ratio of solvent) |
|---|---|---|---|---|---|
| Example 4 | aluminum purity: 99.5% (JIS 1050) | 101 | cap: PP plug: LDPE circular, inner plug | inner diameter of liquid charging port (28.0 mm)/outer diameter of plug (29.0 mm) = 0.966 | 1M $LiPF_6$ EC/VC/MEC (28/2/70) |
| Example 5 | aluminum purity: 99.5% (JIS 1050) | 101 | cap: PP plug: LDPE circular, inner plug | inner diameter of liquid charging port (28.0 mm)/outer diameter of plug (28.3 mm) = 0.989 | 1M $LiPF_6$ EC/VC/MEC (28/2/70) |
| Example 6 | aluminum purity: 99.5% (JIS 1050) | 101 | cap: PP plug: LDPE circular, inner plug | inner diameter of liquid charging port (28.0 mm)/outer diameter of plug (29.0 mm) = 0.966 | 1M $LiPF_6$ EC/VC/MEC (28/2/70) |
| Example 7 | aluminum purity: 99.5% (JIS 1050) | 101 | cap: PP plug: LDPE circular, inner plug | inner diameter of liquid charging port (28.0 mm)/outer diameter of plug (29.0 mm) = 0.966 | 1M $LiBF_4$ EC/GBL/DME (20/10/70) |
| Example 8 | aluminum purity: 99.5% (JIS 1050) | 101 | cap: PP plug: LDPE circular, outer plug | inner diameter of plug (31.0 mm)/outer diameter of liquid charging port (32.0 mm) = 0.969 | 1M $LiPF_6$ EC/VC/MEC (28/2/70) |
| Example 9 | aluminum purity: 99.5% (JIS 1050) | 101 | integrated cap and plug: PP circular protrusion inside cap | angle between circular protrusion and inner wall of liquid charging port: 15° | 1M $LiPF_6$ EC/VC/MEC (28/2/70) |
| Comparative Example 3 | stainless steel | 650 | cap: stainless steel plug: none | — | 1M $LiPF_6$ EC/VC/MEC (28/2/70) |

| | Charging ratio of nonaqueous electrolytic solution (%) | Analysis result of nonaqueous electrolytic solution | Number of operation 2 | | | | Level of opening and closing properties of cap (3rd time) |
|---|---|---|---|---|---|---|---|
| | | | 0 | 1 | 2 | 3 | |
| Example 4 | 90 | water content (ppm) | 6 | 5 | 5 | 4 | level 1 |
| | | Acid content (ppm) | 7 | 29 | 32 | 39 | |
| | | APHA value *1 | <10 | 20 | 40 | 50 | |
| Example 5 | 90 | water content (ppm) | 6 | 7 | 8 | 8 | level 2 |
| | | Acid content (ppm) | 7 | 35 | 41 | 53 | |
| | | APHA value *1 | <10 | 20 | 40 | 50 | |
| Example 6 | 40 | water content (ppm) | 6 | 5 | 5 | 7 | level 2 |
| | | Acid content (ppm) | 7 | 30 | 35 | 45 | |
| | | APHA value *1 | <10 | 20 | 40 | 50 | |
| Example 7 | 90 | water content (ppm) | 7 | 6 | 6 | 5 | level 1 |
| | | Acid content (ppm) | 5 | 15 | 18 | 22 | |
| | | APHA value *1 | <10 | 10 | 20 | 30 | |
| Example 8 | 90 | water content (ppm) | 6 | 5 | 4 | 4 | level 1 |
| | | Acid content (ppm) | 7 | 27 | 30 | 35 | |
| | | APHA value *1 | <10 | 20 | 30 | 40 | |
| Example 9 | 90 | water content (ppm) | 6 | 6 | 7 | 7 | level 2 |
| | | Acid content (ppm) | 7 | 33 | 39 | 49 | |
| | | APHA value *1 | <10 | 20 | 40 | 50 | |
| Comparative Example 3 | 90 | water content (ppm) | 6 | 7 | 8 | 9 | level 3 |
| | | Acid content (ppm) | 7 | 51 | 66 | 79 | |
| | | APHA value *1 | <10 | 30 | 50 | 60 | | note:
LDPE shows low density polyethylene, and
"<10" shows "less than 10".

It is understood from Table 2 that the nonaqueous electrolytic solutions stored in the aluminum containers of Examples 4 to 9 of the present invention show small increase of the water content and the acid content in the nonaqueous electrolytic solution and show less coloration, as compared to the nonaqueous electrolytic solution stored in the stainless steel container of Comparative Example 3.

An electrolytic solution containing a component that is in a solid state at ordinary temperature, such as a lithium salt, e.g., $LiPF_6$, and ethylene carbonate, forms an increased amount of deposited matters on the neck portion of the container, which deteriorate the sealing property, and thus the lithium salt may be reacted with water entering into the container to cause formation of an acid content (HF) and coloration. The deposited matters may also deteriorate the opening and closing properties of the cap. By using the aluminum container of the present invention, however, the water content and the HF concentration in the electrolytic solution are not increased, coloration thereof is difficult to occur, and furthermore the cap and the plug are not impaired in opening or closing to provide good handleability.

The same advantages are obtained in the case where the shape of the container of Example 4 is changed from the bottle type to an aluminum-laminated paper bag type or an aluminum pouch type, and the same polypropylene cap and polyethylene inner plug as in Example 4 are used.

INDUSTRIAL APPLICABILITY

The container for a nonaqueous electrolytic solution and the method for storing a nonaqueous electrolytic solution according to the present invention can conveniently maintain a nonaqueous electrolytic solution to have high quality, and thus are significantly useful for storage and application of a nonaqueous electrolytic solution.

DESCRIPTION OF SYMBOLS

1: canister (bottle type)
2: canister body
3: liquid charging port
4: skirt wall
5: neck portion
6: screw part
7: inner plug
8: outer plug
9: cap with circular protrusion (plug)

The invention claimed is:
1. A combination comprising:
a nonaqueous electrolytic solution comprising at least one of ethylene carbonate and vinylene carbonate, the nonaqueous electrolytic solution having dissolved therein at least one electrolyte salt selected from $LiPF_6$, $LiPO_2F_2$, and $LiBF_4$, and
a container,
wherein the nonaqueous electrolytic solution is located in the container, the container comprises a material comprising an aluminum or aluminum alloy layer which is in contact with said nonaqueous electrolytic solution located in the container, and a sealing cap and a plug each formed of a resin, said container being configured such that when said solution is sealed within said container by said cap and plug it maintains a water content of 50 ppm or less, has an APHA value of 150 or less, and an acid content of 100 ppm or less in terms of hydrogen fluoride (HF) after storing for 30 days.

2. The combination according to claim 1, wherein the container is formed of aluminum having a purity of 99% or more or an aluminum-manganese alloy.

3. The combination according to claim 1, wherein the cap is formed of a polypropylene resin, and the plug is formed of a polyethylene resin.

4. The combination according to claim 1, wherein a ratio (inner diameter of liquid charging port)/(outer diameter of plug) or a ratio (inner diameter of plug)/(outer diameter of liquid charging port) is from 0.920 to 0.995.

5. The combination according to claim 1, wherein an acid content of the nonaqueous electrolytic solution after storing for 30 days in the container is 25 ppm or less in terms of hydrogen fluoride (HF).

6. The combination according to claim 1, wherein a change in acid content of the nonaqueous electrolytic solution is within ±20 ppm or less in terms of HF after storing in the container for 30 days.

7. The combination according to claim 1, wherein the nonaqueous electrolytic solution has an APHA value of 30 or less after storing for 30 days.

8. The combination according to claim 1, wherein the electrolyte salt is $LiBF_4$.

9. The combination according to claim 1, wherein the nonaqueous electrolytic solution comprises ethylene carbonate, and the electrolyte salt is $LiPF_6$.

10. A method for storing a nonaqueous electrolytic solution in a container, comprising placing said solution in said container and sealing the container, wherein the nonaqueous electrolytic solution comprises at least one of ethylene carbonate and vinylene carbonate and has dissolved therein at least one electrolyte salt selected from $LiPF_6$, $LiPO_2F_2$, and $LiBF_4$, the container comprises a material comprising an aluminum or aluminum alloy layer and is sealed with a cap and a plug each formed of a resin, and wherein the nonaqueous electrolytic solution is in contact with said aluminum or aluminum alloy layer when in said container and maintains a water content of 50 ppm or less, has an APHA value of 150 or less, and an acid content of 100 ppm or less in terms of hydrogen fluoride (HF) upon storing sealed in the container for 30 days.

11. The method according to claim 10, wherein the container is formed of aluminum having a purity of 99% or more or an aluminum-manganese alloy.

12. The method according to claim 10, wherein the cap is formed of a polypropylene resin, and the plug is formed of a polyethylene resin.

13. The method according to claim 10, wherein a ratio (inner diameter of liquid charging port)/(outer diameter of plug) or a ratio (inner diameter of plug), (outer diameter of liquid charging port) is from 0.920 to 0.995.

14. The method according to claim 10, wherein an acid content of the nonaqueous electrolytic solution after storing sealed for 30 days in the container is 25 ppm or less in terms of hydrogen fluoride (HF).

15. The method according to claim 10, wherein a change in acid content of the nonaqueous electrolytic solution is within ±20 ppm or less in terms of HF after storing sealed in the container for 30 days.

16. The method according to claim 10, wherein the nonaqueous electrolytic solution has an APHA value of 30 or less after storing sealed in the container for 30 days.

17. The method according to claim 10, wherein the electrolyte salt is $LiPO_2F_2$.

18. The method according to claim 10, wherein the nonaqueous electrolytic solution comprises ethylene carbonate, and the electrolyte salt is $LiPF_6$.

19. The combination according to claim 1, wherein the electrolyte salt is at least one selected from $LiPO_2F_2$, and $LiBF_4$.

* * * * *